No. 630,063. Patented Aug. 1, 1899.
J. A. MAIGNEN.
GRANULAR BED FILTER.
(Application filed Nov. 12, 1898. Renewed July 1, 1899.)
(No Model.)
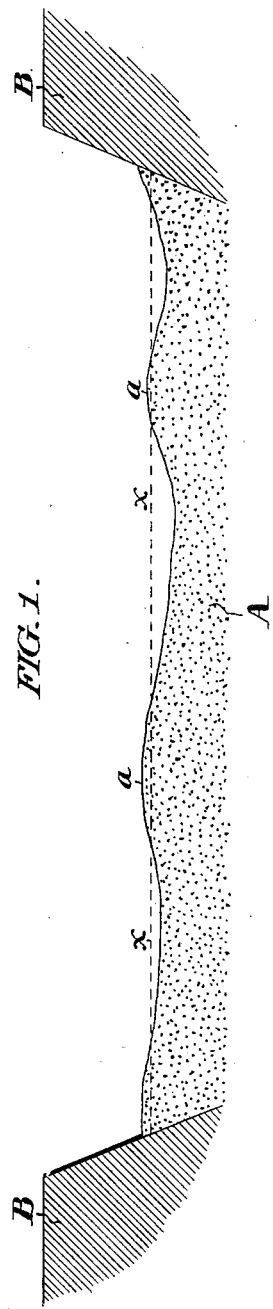
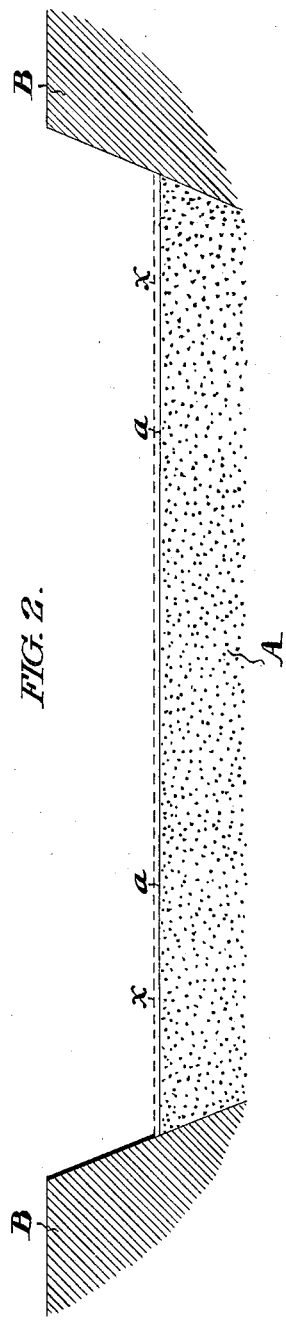
WITNESSES:
E. L. Fullerton.
Clifton C. Hallowell.
INVENTOR:
JEAN A. MAIGNEN,
By Arthur E. Paige
Atty.

UNITED STATES PATENT OFFICE.

JEAN A. MAIGNEN, OF PHILADELPHIA, PENNSYLVANIA.

GRANULAR-BED FILTER.

SPECIFICATION forming part of Letters Patent No. 630,063, dated August 1, 1899.

Application filed November 12, 1898. Renewed July 1, 1899. Serial No. 722,586. (No model.)

*To all whom it may concern:*

Be it known that I, JEAN A. MAIGNEN, of Philadelphia, in the State of Pennsylvania, have invented certain new and useful Improvements in the Formation of Granular-Bed Filters, whereof the following is a specification, reference being had to the accompanying drawings.

My invention relates particularly to filters wherein the flow of the water is downward through a granular bed, at the upper surface of which the initial separation of the impurities from the water is effected. To secure the maximum efficiency at all points in the area of a filter of the aforesaid type, it is obviously essential that the water be uniformly distributed to gravitate uniformly throughout said area. It is well known that to secure such uniformity of operation it is necessary that the upper surface of the granular bed should occupy an absolutely horizontal plane, for any irregularities in said surface through which the water is introduced to the granular mass induces irregularities in the rate of flow through said mass in correspondence with the irregularities of said surface and the flow of water initiated irregularly tends to persist and form conduits through the mass for the passage of the water without filtration. Such irregular action of the filter thus induced by the mere inequalities of the surface aforesaid is subsequently supplemented by the consequent irregular deposit of mud and other freely-suspended matter in the hollows of said surface, while the elevations thereof remain comparatively bare. An irregular upper surface upon a filter of the type specified is therefore so detrimental to its efficiency of operation that the text-books upon the subject lay stress upon the importance of obliterating even such small depressions as foot-prints from a granular bed comprising several acres of top surface.

Ordinarily in the formation of a filter-bed of the class specified its upper surface is leveled by the usual surveying methods, marks being established upon the embankments, from which lines are projected from side to side in both directions, and workmen are employed to reduce the surface to a horizontal plane to correspond with said lines while the granular material is in a dry state. Said leveling operation, being not only necessary in the primary formation of a filter, but upon each subsequent occasion when the filter-bed is cleansed by the removal of the membrane of mud or other suspended material deposited thereon, is an important factor in the expense of maintenance of the filter.

My present invention consists in a simplified method of determining the horizontal plane to which the upper surface of a granular-bed filter must be reduced and in the reduction of such surface to a horizontal plane while said mass is submerged in water.

Figures 1 and 2 of the drawings diagrammatically illustrate steps in my process.

As shown in Fig. 1 of the drawings, the granular mass of filtering material A being deposited within the retaining-walls B the upper surface $a$ of said mass is of course primarily irregular, as indicated. Water is then flowed within the mass, which is saturated therewith until the free plane surface $x$ of the water is above the general level of the irregular surface $a$. Said surface $a$ is then reduced to parallelism with the surface $x$ of the water, as indicated in Fig. 2, and the mass A is then ready for operation as a filter. Said process of formation is of course the same whether the mass is to be primarily formed or re-formed subsequent to the removal of the accumulated deposit upon its surface.

My improved process is not only advantageous in that an absolutely horizontal plane is established without cost of surveying, &c., but a further advantage consists in that whereas in the ordinary process of formation the level surface is established with the granular material in a dry state and is therefore more or less disturbed by the subsequent influx of water by my improved method of formation the mass of material is primarily saturated, and when leveled so remains.

It is obviously not of the essence of my invention for the water-level $x$ to be established with respect to the surface $a$ of the granular bed in the precise relation which I have illustrated. It is, however, essential that said water-level be so established as to be comparable with the surface of the granular mass at any point therein and the horizontal plane of the latter be thereby determined. I therefore do not desire to limit myself to the precise relation of the planes which I have shown. It is, moreover, to be understood that I have used the term "water" herein in a descriptive and not in a restrictive sense, as it is obvious that the precise nature of the liquid filtered is not of the essence of my invention.

I claim—

The hereinbefore-described process of formation of granular-bed filters, consisting in saturating a mass of granular material with water until a horizontal plane of said water is established, in such relation with said mass as to be comparable with the upper surface of the latter, and reducing the upper surface of said mass to parallelism with the plane surface of said water, substantially as and for the purpose set forth.

JEAN A. MAIGNEN.

Witnesses:
EDWARD EVERITT,
ARTHUR E. PAIGE.